United States Patent Office 3,121,088
Patented Feb. 11, 1964

3,121,088
DIQUATERNARY BIS-(PYRIDYL-4-THIO)-ALKANES
Dietrich Jerchel and Klaus Thomas, both of Biberach an der Riss, Germany, assignors to Dr. Karl Thomae G.m.b.H., Biberach an der Riss, Germany, a corporation of Germany
No Drawing. Filed Apr. 26, 1961, Ser. No. 105,550
7 Claims. (Cl. 260—294.8)

This invention relates to novel diquaternary compounds, and more particularly to diquaternary bis-(pyridyl-4-thio)-alkanes of the formula

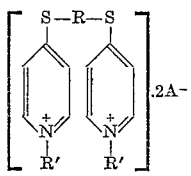

(I)

wherein:

R is a straight or branched chain alkylene, alkenylene or alkinylene radical with 1–16 carbon atoms, whose carbon chains may be interrupted by an oxygen or sulfur atom, R' is a straight or branched chain alkyl, alkenyl or alkinyl radical with 1–16 carbon atoms which may carry as a substituent a hydroxyl or alkoxy radical, an amino group or an alkylthio, carbalkoxy, aralkyl, aryl, aryloxy or arylthio radical, where the aryl radical may in turn be substituted with halogen atoms, lower alkyl, alkoxy or nitro groups, and
A is the anion of an organic or inorganic acid, such as a hydrogen halide acid, an alkyl sulfuric acid or an aromatic sulfonic acid.

The novel compounds according to the invention may be prepared by a number of different methods, but the following have been found to be most convenient and efficient:

Method A.—Reaction of a bis-(pyridyl-4-thio)-alkane of the formula

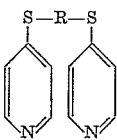

(II)

wherein R has the meanings indicated above, with a quaternizing agent of the formula

R'A (III)

wherein R' and A have the above indicated meanings. The reaction is effected at elevated temperatures, preferably at temperatures between 80 and 200° C. The duration of reaction depends upon the type of compound R'A employed and may range from a few minutes to several hours; in most cases heating for one hour at 100° C. is sufficient to achieve a satisfactory yield. At least two mols of compound III or any desired excess thereover per mol of bis-(pyridylthio)-alkane are employed.

The reaction may be performed in the presence or absence of an organic solvent. Most conveniently, the reaction is carried out at the boiling point of compound III or of the solvent, if one is used. In the event that the boiling point of compound III or of the solvent employed is below the particular optimum reaction temperature, the reaction is advantageously carried out at elevated pressures.

The reaction mixture is worked up in the usual manner by distilling off any excess of compound III which might be present or distilling off the solvent, if one is used, and subsequently recrystallizing or reprecipitating the residue from a suitable solvent.

In the compounds thus obtained a particular anion A may, if desired, be transformed into any other anion A of an organic or inorganic acid; this may be accomplished according to known methods, such as by double decomposition.

The bis-(pyridyl-4-thio)-alkanes of the Formula II, which are used as starting materials in the above method, may be obtained from 4-mercapto-pyridine by reaction with the corresponding alkylene-dihalides in the presence of an inorganic or organic base, in accordance with known methods. Most conveniently, they may be obtained by saturating solutions of pyridyl-4-pyridinium salts with hydrogen sulfide and subsequently reacting these solutions with the corresponding alkylene-dihalide, in the presence of agents capable of neutralizing or tying up hydrogen halides, at temperatures between 60 and 150° C.

Method B.—For the preparation of compounds of the Formula I, wherein A is a halogen: Reaction of pyridinium salts of the formula

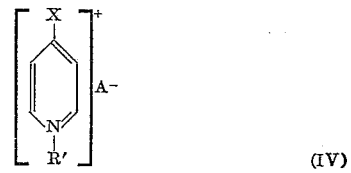

(IV)

with a compound of the formula

Y—R—Y (V)

In formulas IV and V, R' and R have the meanings previously indicated in connection with Formula I. A is a halogen, X is either a halogen atom or a mercapto group, and Y is either a mercapto group if X is halogen or a halogen if X is a mercapto group.

About one-half mol of compound V is used per mol of pyridinium salt. The reaction is carried out at elevated temperatures, preferably at temperatures above 80° C., and if necessary in the presence of an acid-binding agent. An inorganic or organic base may be used as the acid-binding agent.

The reaction is advantageously carried out in the presence of an inert solvent, such as ethanol, dioxane, benzene, toluene, butanol, dimethylformamide or the like. The reaction mixture is worked up, as described under Method A above, by recrystallization or reprecipitation after separating the salt of the inorganic or organic base formed by the reaction and after distilling off the solvent, if one is used.

The pyridinium salts of the Formula IV, which are used as starting materials in Method B, are either known substances or may be readily prepared in known fashion by quaternization of the corresponding pyridines or by reaction of halogen-substituted pyridinium salts with potassium hydrosulfide.

The following examples illustrate the preparation of a few representative species of the group of compounds represented by Formula I above. It should be understood, however, that these examples are given for purposes of illustration only, and that the present invention is not limited solely to the scope of the examples.

EXAMPLE I

Bis-(1-Methyl-Pyridinium-4-Thio)-Methane Di-p-Toluene-Sulfonate

A mixture of 2.0 gm. (0.0172 mol) of bis-(pyridyl-4-thio)-methane and 3.2 gm. (0.00855 mol) of p-toluenesulfonic acid methyl ester was heated for one hour on a steam bath. Thereafter, the reaction mixture was allowed to cool and was then recrystallized from a mixture of methanol and ether, yielding 4.4 gm. (85% of theory) of the crystalline diquaternary compound of the formula

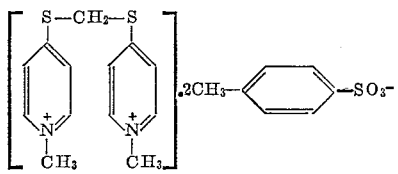

having a melting point of 163–166° C.

EXAMPLE II

Using a procedure analogous to that described in Example I, the diquaternary salt of the formula

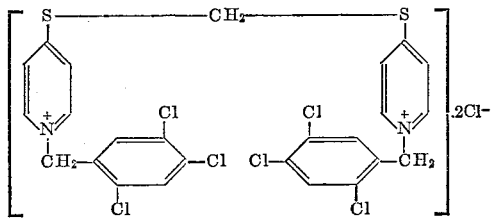

was prepared from bis-(pyridyl-4-thio)-methane and 3,4,6-trichlorobenzyl chloride. The reaction period was one hour and the reaction temperature 100° C. The product had a melting point of 163–166° C. The yield was 65% of theory.

EXAMPLE III

Using a procedure analogous to that described in Example I, the diquaternary salt of the formula

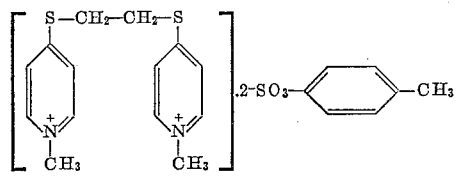

was prepared from 1,2-bis-(pyridyl-4-thio)-ethane and p-toluene-sulfonic acid methyl ester. The reaction period was one-half hour and the reaction temperature 100° C. The product had a melting point of 209–211° C. The yield was 91% of theory.

EXAMPLE IV

Using a procedure analogous to that described in Example I, the diquaternary salt of the formula

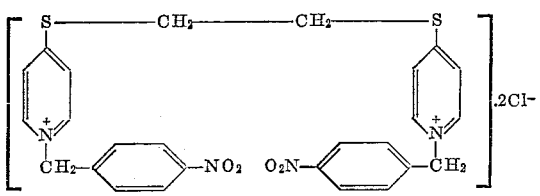

was prepared from 1,2-bis-(pyridyl-4-thio)-ethane and p-nitro-benzyl chloride. The reaction period was two hours and the reaction temperature 150° C. The product had a melting point of 215–216° C. The yield was 67% of theory.

EXAMPLE V

Using a procedure analogous to that described in Example I, the diquaternary salt of the formula

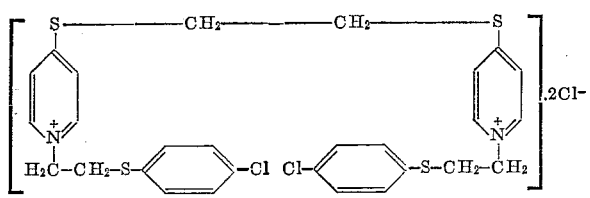

was prepared from 1,2-bis-(pyridyl-4-thio)-ethane and the quaternizing agent of the formula

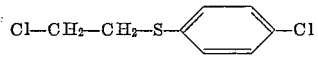

The reaction period was five hours and the reaction temperature 200° C. The product had a melting point of 197–199° C. The yield was 59% of theory.

EXAMPLE VI

Using a procedure analogous to that described in Example I, the diquaternary salt of the formula

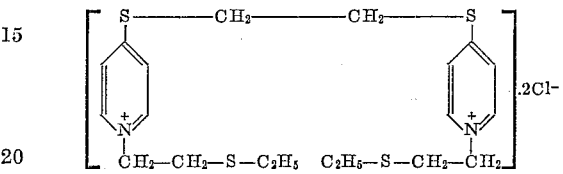

was prepared from 1,2-bis-(pyridyl-4-thio)-ethane and the quaternizing agent of the formula

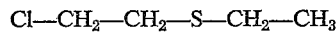

The reaction period was two hours and the reaction temperature 150° C. The product had a melting point of 203–205° C. The yield was 87% of theory.

EXAMPLE VII

Using a procedure analogous to that described in Example I, the diquaternary salt of the formula

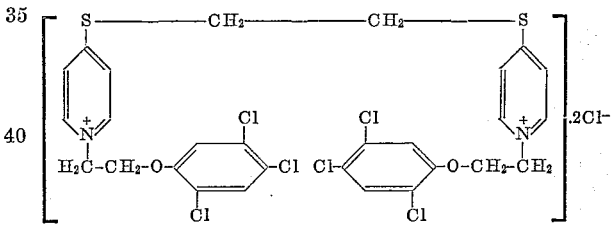

was prepared from 1,2-bis-(pyridyl-4-thio)-ethane and the quaternizing agent of the formula

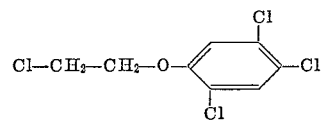

The reaction period was three hours and the reaction temperature 160° C. The product had a melting point of 224–226° C. The yield was 76% of theory.

EXAMPLE VIII

Using a procedure analogous to that described in Example I, except that ethyl acetate was used as a solvent medium for the starting materials, the diquaternary salt of the formula

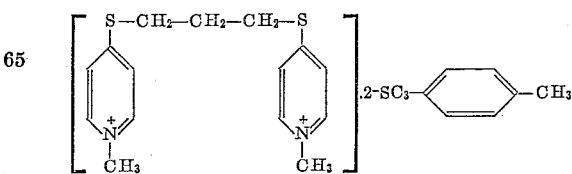

was prepared from 1,3-bis-(pyridyl-4-thio)-propane and p-toluene-sulfonic acid methyl ester. The reaction mixture was refluxed for three hours. The product had a melting point of 135–138° C. The yield was 82% of theory.

EXAMPLE IX

Using a procedure analogous to that described in Example I, the diquaternary salt of the formula

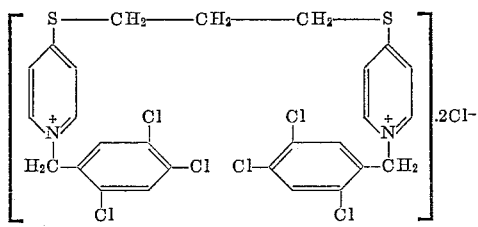

was prepared from 1,3-bis(pyridyl-4-thio)-propane and 3,4,6-trichloro-benzylchloride. The reaction period was one hour and the reaction temperature 100° C. The product had a melting point of 160–162° C. The yield was 96% of theory.

EXAMPLE X

Using a procedure analogous to that described in Example I, except that chloroform was used as a solvent medium for the starting materials, the diquaternary salt of the formula

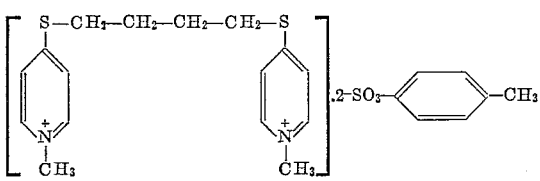

was prepared from 1,4-bis-(pyridyl-4-thio)-butane and p-toluene-sulfonic acid methyl ester. The reaction mixture was refluxed for four hours. The product had a melting point of 180–182° C. The yield was 88%.

EXAMPLE XI

Using a procedure analogous to that described in Example I, except that chloroform was used as a solvent medium for the starting materials, the diquaternary salt of the formula

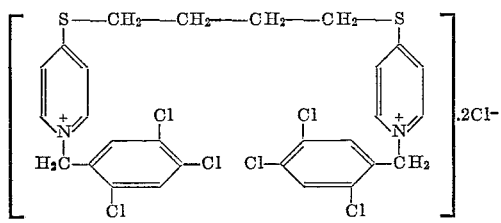

was prepared from 1,4-bis-(pyridyl-4-thio)-butane and 3,4,6-trichloro-benzylchloride. The reaction period was one hour and the reaction temperature 100° C. The product had a melting point of 156–159° C. The yield was 87% of theory.

EXAMPLE XII

Using a procedure analogous to that described in Example I, except that n-butanol was used as a solvent medium for the starting materials, the diquaternary salt of the formula

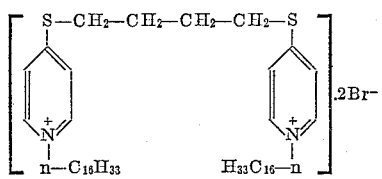

was prepared from 1,4-bis-(pyridyl-4-thio)-butane and n-hexadecyl bromide. The reaction period was six hours and the reaction temperature 115° C. The product had a melting point of 138° C. The yield was 45% of theory.

EXAMPLE XIII

Using a procedure analogous to that described in Example I, the diquaternary salt of the formula

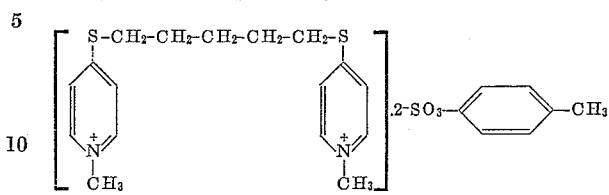

was prepared from 1,5-bis-(pyridyl-4-thio)-pentane and p-toluene-sulfonic acid methyl ester. The reaction period was one hour and the reaction temperature 100° C. The product had a melting point of 168–170° C. The yield was 85% of theory.

EXAMPLE XIV

Using a procedure analogous to that described in Example I, the diquaternary salt of the formula

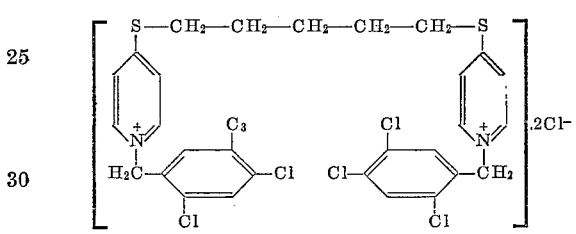

was prepared from 1,5-bis-(pyridyl-4-thio)-pentane and 3,4,6-trichloro-benzylchloride. The reaction period was one hour and the reaction temperature 100° C. The product had a melting point of 127–129° C. The yield was 97% of theory.

EXAMPLE XV

Using a procedure analogous to that described in Example I, except that methanol was used as a solvent medium for the starting materials, the diquaternary salt of the formula

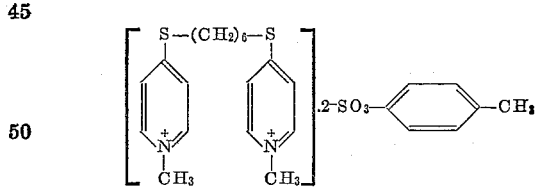

was prepared from 1,6-bis-(pyridyl-4-thio)-hexane and p-toluene-sulfonic acid methyl ester. The reaction mixture was refluxed for four hours. The product had a melting point of 141–143° C. The yield was 90% of theory.

EXAMPLE XVI

Using a procedure analogous to that described in Example I, the diquaternary salt of the formula

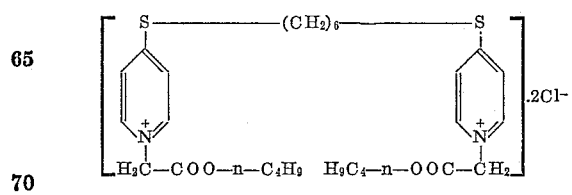

was prepared from 1,6-bis-(pyridyl-4-thio)-hexane and chloroacetic acid n-butyl ester. The reaction period was eight hours and the reaction temperature 80° C. The product had a melting point of 189° C. The yield was 50% of theory.

EXAMPLE XVII

Using a procedure analogous to that described in Example I, the diquaternary salt of the formula

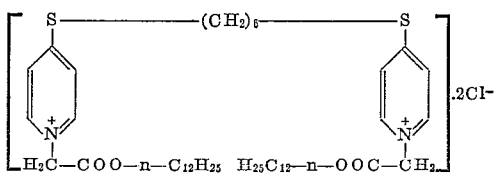

was prepared from 1,6-bis-(pyridyl-4-thio)-hexane and chloroacetic acid n-dodecyl ester. The reaction period was eight hours and the reaction temperature 80° C. The product had a melting point of 20–25° C. The yield was 54% of theory.

EXAMPLE XVIII

Using a procedure analogous to that described in Example I, the diquaternary salt of the formula

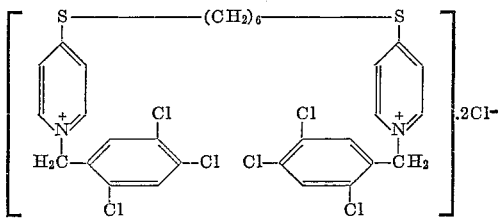

was prepared from 1,6-bis-(pyridyl-4-thio)-hexane and 3,4,6-trichloro-benzylchloride. The reaction period was one hour and the reaction temperature 100° C. The product had a melting point of 125–128° C. The yield was 90% of theory.

EXAMPLE XIX

Using a procedure analogous to that described in Example I, the diquaternary compound of the formula

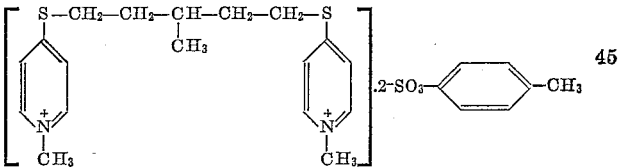

was prepared from 1,5-bis-(pyridyl-4-thio)-3-methyl-pentane and p-toluene-sulfonic acid methyl ester. The reaction period was six hours and the reaction temperature 90° C. The product had a melting point of 80–82° C. The yield was 67% of theory.

EXAMPLE XX

Using a procedure analogous to that described in Example I, except that acetonitrile was used as a solvent medium for the starting materials, the diquaternary compound of the formula

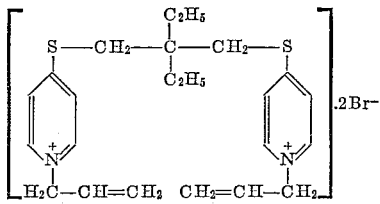

was prepared from 1,3-bis-(pyridyl-4-thio)-2,2-diethyl-propane and allyl bromide. The reaction mixture was refluxed for four hours. The product had a melting point of 40° C. The yield was 50% of theory.

EXAMPLE XXI

Using a procedure analogous to that described in Example I, the diquaternary compound of the formula

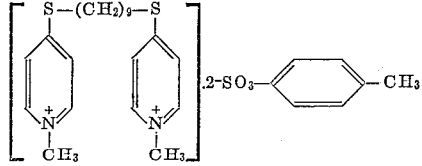

was prepared from 1,9-bis-(pyridyl-4-thio)-nonane and p-toluene-sulfonic acid methyl ester. The reaction period was two hours and the reaction temperature 80° C. The product had a melting point of 150° C. The yield was 77%.

EXAMPLE XXII

Using a procedure analogous to that described in Example I, except that ethanol was used as a solvent medium for the reactants, the diquaternary compound of the formula

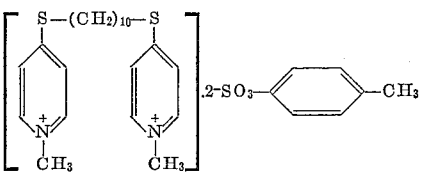

was prepared from 1,10-bis-(pyridyl-4-thio)-decane and p-toluene-sulfonic acid methyl ester. The reaction mixture was refluxed for four hours. The product had a melting point of 188–190° C. The yield was 75% of theory.

EXAMPLE XXIII

Using a procedure analogous to that described in Example I, the diquaternary compound of the formula

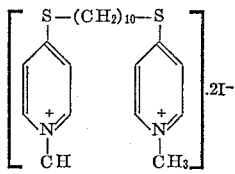

was prepared from 1,10-bis-(pyridyl-4-thio)-decane and methyl iodide. The methyl iodide was provided in excess over the 2:1 stoichiometric ratio and simultaneously served as the solvent medium for the reaction. The reaction mixture was refluxed for three hours. The product had a melting point of 165–170° C. The yield was 64% of theory.

EXAMPLE XXIV

Using a procedure analogous to that described in Example I, the diquaternary compound of the formula

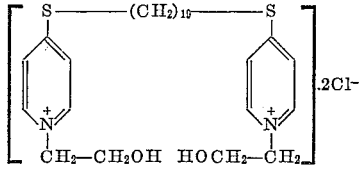

was prepared from 1,10-bis-(pyridyl-4-thio)-decane and 2-chloroethanol. The reaction temperature was 100° C. and the reaction period three hours. The product had a melting point of 148° C. The yield was 53% of theory.

EXAMPLE XXV

Using a procedure analogous to that described in Example I, except that acetonitrile was used as a solvent medium for the reactants, the diquaternary compound of the formula

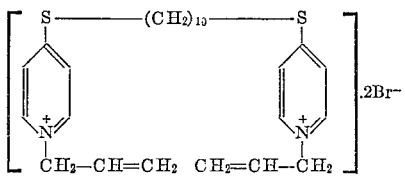

was prepared from 1,10-bis-(pyridyl-4-thio)-decane and allyl bromide. The reaction mixture was refluxed for three hours. The product had a melting point of 112–115° C. The yield was 75% of theory.

EXAMPLE XXVI

Using a procedure analogous to that described in Example I, the diquaternary compound of the formula

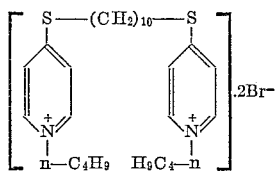

was prepared from 1,10-bis-(pyridyl-4-thio)-decane and n-butyl bromide. The reaction period was eight hours and the reaction temperature 120° C. The product had a melting point of 108–110° C. The yield was 32% of theory.

EXAMPLE XXVII

Using a procedure analogous to that described in Example I, the diquaternary compound of the formula

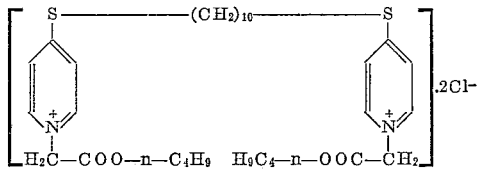

was prepared from 1,10-bis-(pyridyl-4-thio)-decane and chloroacetic acid n-butyl ester. The reaction period was three hours and the reaction temperature 100° C. The product had a melting point of 162–165° C. The yield was 69% of theory.

EXAMPLE XXVIII

Using a procedure analogous to that described in Example I, the diquaternary compound of the formula

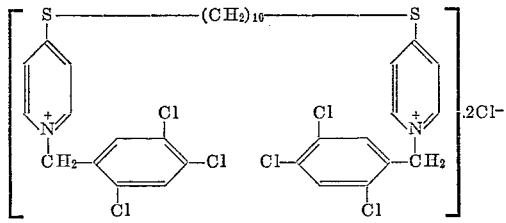

was prepared from 1,10-bis-(pyridyl-4-thio)-decane and 3,4,6-trichloro-benzylchloride. The reaction period was one hour and the reaction temperature 100° C. The product had a melting point of 107–110° C. The yield was 66% of theory.

EXAMPLE XXIX

Using a procedure analogous to that described in Example I, the diquaternary compound of the formula

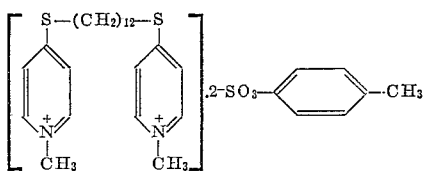

was prepared from 1,12-bis-(pyridyl-4-thio)-dodecane and p-toluene-sulfonic acid methyl ester. The reaction period was six hours and the reaction temperature 90° C. The product had a melting point of 210–213° C. The yield was 66% of theory.

EXAMPLE XXX

Using a procedure analogous to that described in Example I, the diquaternary compound of the formula

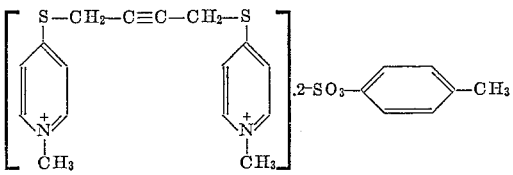

was prepared from 1,4-bis-(pyridyl-4-thio)-butyne-(2) and p-toluene-sulfonic acid methyl ester. Acetonitrile was used as a solvent medium for the reactants. The reaction mixture was refluxed for six hours. The product had a melting point of 208–210° C. The yield was 94% of theory.

EXAMPLE XXXI

Using a procedure analogous to that described in Example I, the diquaternary compound of the formula

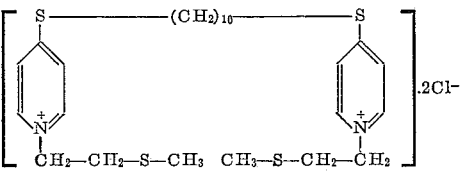

was prepared from 1,10-bis-(pyridyl-4-thio)-decane and β-methylmercapto-ethyl chloride. Acetonitrile was used as the solvent medium for the reactants. The reaction mixture was refluxed for five hours. The product had a melting point of 70° C. The yield was 16% of theory.

EXAMPLE XXXII

Using a procedure analogous to that described in Example I, an isomeric mixture of the diquaternary compound of the formula

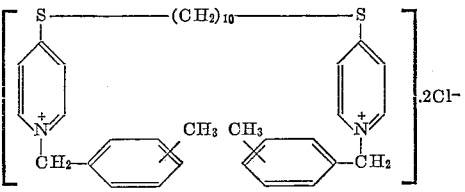

was prepared from 1,10-bis-(pyridyl-4-thio)-decane and an isomeric mixture of xylyl chloride. Acetonitrile was used as a solvent medium for the reactants. The reaction mixture was heated for twenty-eight hours at 40° C. The product had a melting point of 144–150° C. The yield was 50% of theory.

EXAMPLE XXXIII

Using a procedure analogous to that described in Example I, the diquaternary compound of the formula

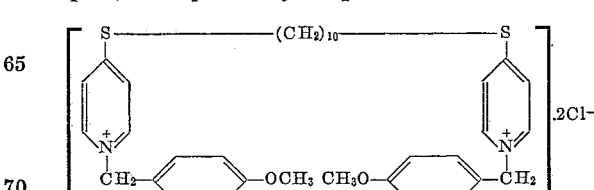

was prepared from 1,10-bis-(pyridyl-4-thio)-decane and p-methoxy-benzyl chloride. Acetonitrile was used as a solvent medium for the reactants. The reaction mixture was heated for twenty-eight hours at 40° C. The product had a melting point of 120–125° C. The yield was 83% of theory.

EXAMPLE XXXIV

Using a procedure analogous to that described in Example I, the diquaternary compound of the formula

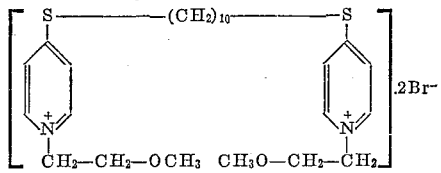

was prepared from 1,10-bis-(pyridyl-4-thio)-decane and β-methoxy-ethyl bromide. Butanol was used as a solvent medium for the reactants. The reaction mixture was refluxed for three hours. The product had a melting point of 128–132° C. The yield was 56% of theory.

EXAMPLE XXXV

Using a procedure analogous to that described in Example I, the quaternary compound of the formula

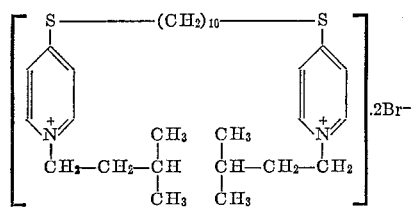

was prepared from 1,10-bis-(pyridyl-4-thio)-decane and isoamyl bromide. Acetonitrile was used as a solvent medium for the reactants. The reaction mixture was refluxed for six hours. The product had a melting point of 140–142° C. The yield was 64% of theory.

EXAMPLE XXXVI

Using a procedure analogous to that described in Example I, the diquaternary compound of the formula

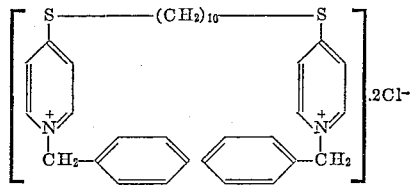

was prepared from 1,10-bis-(pyridyl-4-thio)-decane and benzyl chloride. Acetonitrile was used as a solvent medium for the reactants. The reaction mixture was refluxed for six hours. The product had a melting point of 183–185° C. The yield was 74% of theory.

EXAMPLE XXXVII

Using a procedure analogous to that described in Example I, the diquaternary compound of the formula

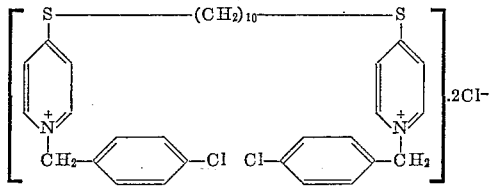

was prepared from 1,10-bis-(pyridyl-4-thio)-decane and p-chloro-benzyl chloride. Acetonitrile was used as a solvent medium for the reactants. The reaction mixture was refluxed for six hours. The product had a melting point of 149–150° C. The yield was 62% of theory.

EXAMPLE XXXVIII

*1,2-Bis-[1'-Methyl-Pyridinium-(4')-Thio]-Ethane Diiodide*

A mixture of 1.2 gm. of ethylene dithiol (dithio- glycol), 6.5 gm. of 4-chloro-pyridine iodomethylate and 50 cc. of dimethylformamide was heated for eight hours on a steam bath. Thereafter, the solvent was evaporated in vacuo and the residue was recrystallized from acetonitrile, yielding 1.2 gm. (18% of theory) of the diquaternary compound of the formula

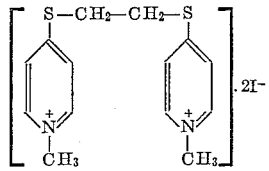

having a melting point of 220–222° C.

The diiodide was dissolved in water, the resulting solution was subjected to treatment with a basic ion exchanger in the chloride form (Dowex 1X8) and solution thus treated was evaporated almost to dryness. The residue consisted essentially of 1,2-bis-[1'-methyl-pyridinium-(4')-thio]-ethane dichloride of the formula

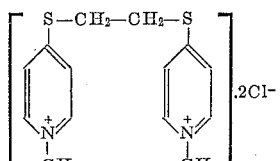

having a melting point of 230° C.

EXAMPLE XXXIX

*1,10-Bis-[1'-Methyl-Pyridinium-(4')-Thio]-n-Decane Dibromide*

A mixture of 11 gm. of 4-chloro-pyridinium-iodomethylate, 37 gm. of potassium hydrosulfide and 180 cc. of absolute ethanol was heated for six hours at 60° C. The inorganic salt which precipitated out was separated by vacuum filtration, the filtrate was concentrated by evaporation and the evaporation residue was extracted with acetone. The extract solution was evaporated, yielding 5.0 gm. of an intermediate believed to be 4-mercapto-N-methyl-pyridine. 1.0 gm. of this compound was admixed with 1.2 gm. of 1,10-dibromo-n-decane. The mixture was heated in butanol for thirty minutes at about 80° C. Upon cooling, a precipitate formed which was recrystallized from acetonitrile, yielding 2.0 gm. (91% of theory) of the diquaternary compound of the formula.

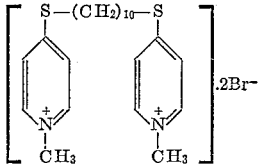

having a melting point of 166–170° C.

EXAMPLE XL

*4,4'-bis-[1'-Methyl-Pyridinium-(4'')-Thio]- Di-n-Butylether Dichloride*

A mixture of 0.9 gm. of 4,4'-dichloro-di-n-butylether and 1.0 gm. of 4-mercapto-N-methyl-pyridine was refluxed in butanol for four hours. After allowing the reaction mixture to cool, ether was added thereto, whereby a precipitate formed which was separated and recrystallized from a mixture of alcohol and ether. 0.35 gm. (19% of theory) of the diquaternary compound of the formula

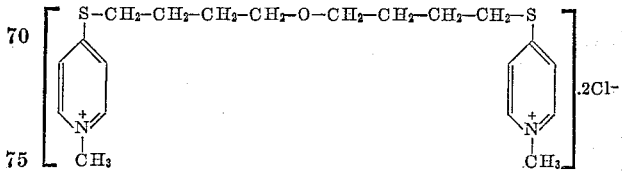

were obtained. The product had a melting point of 104–106° C.

The novel diquaternary salts according to the present invention exhibit excellent bactericidal and fungicidal activities; in this respect they are substantially and surprisingly superior to known quaternary pyridinium salts. They are further marked by good skin compatibility and good diffusion properties. They also do not exhibit any significant albumin incompatibility. Their fungicidal activity is especially effect against usually difficultly combattable fungi, such as *Aspergillus niger* and *Candida albicans*. They do not release any undesirable side effects which could reasonably have been expected on the basis of their chemical structure; more particularly, the diquaternary salts according to the present invention do not exhibit any parasympatholytic, ganglionic blocking or neuromuscular activities. Their toxicity is relatively low; for instance, the $LD_{50}$ of 1,10-bis-(1'-methyl-pyridinium-4'-thio)-n-decane, di-p-toluene-sulfonate in mice is only 110 mgm./kg. body weight. Moreover, chronic toxicity tests on rats have shown that a weekly dose rate of 300 mgm./kg. of the quaternary compounds of the invention over a period of three months did not produce any appreciable toxicity symptoms; post-sacrificial section and histological examination of the test animals did not indicate any adverse pathological changes.

Thus, the novel diquaternary compounds according to the present invention are useful as bactericidal and fungicidal therapeutic agents.

For therapeutic purposes the compounds according to the present invention are preferably administered in dosage unit composition form, that is, in the form of dosage units comprising a specified dose of the active ingredient and one or more inert diluents or carriers. Thus, the bactericial and fungicidal compounds of the invention may be administered in the form of pastes, aerosols, powders, tinctures, ointments, tablets, coated pills, etc. The inert diluent or carrier components in these dosage unit compositions may be customary ointment base materials, such as paraffin oil, Vaseline, glycerin monostearate and various emulsifiers; they may also be solid carriers, such as talcum, silicon dioxide and titanium dioxide; they may further be liquid inert solvents, such as ethanol, methylene chloride, isopropyl alcohol, etc.; finally, they may include the customary tablet-making assistants, such as magnesium stearate, lactose, starch and the like.

The preferred concentration of the active bactericidal and fungicidal components in these dosage unit compositions is 0.1 to 5% by weight. The individual dose for internal therapeutic administration is between 0.1 and 2.5 mgm., preferably 0.25 to 1.0 mgm. For dermatological therapy 1–10 gm. per day of an ointment containing 0.1–1% by weight of active ingredient are needed as a rule.

The following examples illustrate typical dosage unit compositions comprising the compounds according to the present invention as active bactericidal and fungicidal ingredients. The parts are parts by weight, unless otherwise specified.

EXAMPLE XLI

OINTMENT (OIL-IN-WATER EMULSION)

The ointment is compounded from the following ingredients:

[I]

| | Parts |
|---|---|
| Cremophor A, solid [1] | 3.0 |
| Emulgade F [2] | 6.0 |
| Glycerin monostearate | 7.0 |
| Paraffin oil | 20.0 |
| White Vaseline | 10.0 |

[1] Trademark for emulsifier sold by Badische Anilin-und Sodafabrik, Ludwigshafen am Rhein, Germany, and consisting of a non-ionic fatty alcohol derivative.
[2] Trademark for emulsifier sold by Dehydag Deutsche Hydrierwerke G.m.b.H., Dusseldorf, Germany, and consisting of a mixthre of higher molecular fatty alcohols, fatty alcohol sulfates and non-ionic emulsifiers.

[II]

| | |
|---|---|
| 1,10-bis-(1'-methyl-pyridinium-4'-thio)-n-decane di-(p-toluene sulfonate) | 0.5 |
| Distilled water | 53.5 |
| Total | 100.0 |

*Compounding procedure.*—Ingredients in bracket [I] are admixed and the mixture is melted on a water bath at 70° C. A solution is prepared from the ingredients in bracket [II], heated to 70° C. and emulsified into molten mixture [I]. The resulting emulsion is then stirred until cool. The resulting ointment contains 0.5% by weight of the active bactericidal and fungicidal agent.

EXAMPLE XLII

PASTE

The paste is compounded from the following ingredients:

| | Parts |
|---|---|
| 1,10-bis-(1'-methyl-pyridinium-4'-thio)-n-decane di-(p-toluene sulfonate) | 1.0 |
| Colloidal silicon dioxide | 0.5 |
| Titanium dioxide | 15.0 |
| White Vaseline | 60.0 |
| White wax | 7.5 |
| Paraffin oil | 16.0 |
| Total | 100.0 |

*Compounding procedure.*—A molten mixture of the white Vaseline, the white wax and the paraffin oil is prepared. The remaining solid ingredients are then blended in sequence into the molten mixture, and the finished composition is then stirred until cool. The resulting paste contains 1.0% by weight of the active bactericidal and fungicidal ingredient.

EXAMPLE XLIII

DUSTING POWDER

The dusting powder is compounded from the following ingredients:

| | Parts |
|---|---|
| 1,10-bis-(1'-methyl-pyridinium-4'-thio)-n-decane di-(p-toluene sulfonate) | 0.5 |
| Talcum | 99.5 |
| Total | 100.0 |

*Compounding procedure.*—The active ingredient is passed through a No. 6 screen and is then thoroughly blended with the talcum. The mixture is then again passed through a No. 5 screen. The resulting dusting powder contains 0.5% by weight of the active fungicidal and bactericidal ingredient.

EXAMPLE XLIV

TINCTURE

The tincture is compounded from the following ingredients:

| | Parts |
|---|---|
| 1,10-bis-(1'-methyl-pyridinium-4'-thio)-n-decane di-(p-toluene sulfonate) | 0.5 |
| Ethanol | 40.0 |
| Methylene chloride | 7.0 |
| Distilled water | 52.5 |
| Total | 100.0 |

*Compounding procedure.*—The methylene chloride is dissolved in the ethanol. The resulting solution is then thoroughly admixed with a solution of the active ingredient in the distilled water. The tincture contains 0.5% by weight of the active fungicidal and bactericidal ingredient.

EXAMPLE XLV
AEROSOL

The aerosol is compounded from the following ingredients:

| | Parts |
|---|---|
| 1,10-bis-(1'-methyl-pyridinium-4'-thio)-n-decane di-(p-toluene sulfonate) | 0.2 |
| Isopropyl myristate | 1.5 |
| Perfume | 0.1 |
| Ethyl alcohol | 30.0 |
| Isopropyl alcohol | 38.2 |
| Difluoro-dichloro-methane | 30.0 |
| Total | 100.0 |

*Compounding procedure.*—The ethanol and the isopropyl alcohol are admixed and in the resulting mixture the active ingredient, the isopropyl myristate and the perfume are dissolved. The resulting solution is then admixed with the difluoro-dichloro-methane and filled into suitable aerosol containers by known methods (under refrigeration or pressure). The aerosol spray contains 0.2% by weight of the active ingredient.

EXAMPLE XLVI
TABLETS

The tablets are compounded from the following ingredients:

| | Parts |
|---|---|
| 1,10-bis-(1'-methyl-pyridinium-4'-thio)-n-decane di-(p-toluene sulfonate) | 0.25 |
| Powdered sugar | 1054.75 |
| Solid fat DAB VI | 40.0 |
| Magnesium stearate | 5.0 |
| Total | 1100.0 |

*Compounding procedure.*—The powdered sugar and the active ingredient are admixed and the mixture is then moistened uniformly first with 80 parts distilled water and then with a solution of the solid fat DAB VI. The moist mass is passed through 1.5 mm.-mesh screen and dried at 40° C. The dry granulate is pressed into tablets weighing 1.1 mgm. each. Each tablet contains 0.25% by weight of the active ingredient.

In the above examples of dosage unit compositions only 1,10-bis-(1'-methyl-pyridinium-4'-thio)-n-decane di-(p-toluene sulfonate) is used as the active ingredient. It is self-evident that any of the other diquaternary compounds according to the present invention may be substituted for this particular compound and that the concentration of the active ingredient in the compositions may be varied within the preferred limits given above to suit the requirements.

The diquaternary compounds according to the present invention also exhibit very satisfactory adhesion properties to fibers and fabrics of various types and impart bactericidal and fungicidal properties to such fibers and fabrics when applied thereto. Even repeated washings of such treated fibers and fabrics do not significantly diminish their bactericidal and fungicidal characteristics. Consequently, the compounds according to the present invention are especially well suited for impregnating textiles, leather products, paper goods and wood products therewith in order to impart lasting bactericidal and fungicidal properties thereto.

While we have illustrated the present invention with the aid of certain specific embodiments thereof, it will be apparent to those skilled in the art that our invention is not limited solely to these embodiments and that various changes and modifications may be made without departing from the spirit of the invention or the scope of the appended claims.

We claim:

1. A diquaternary compound of the formula

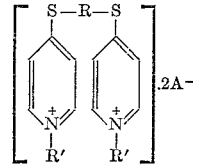

wherein:
R is selected from the group consisting of divalent acyclic hydrocarbons of 1 to 16 carbon atoms and symmetrical lower alkylene-O-lower alkylene where said lower alkylene has from 1 to 8 carbon atoms,
R' is selected from the group consisting of alkyl of 1 to 16 carbon atoms, lower alkenyl, hydroxy-lower alkyl, lower alkoxy-lower alkyl, lower alkylthio-lower alkyl, halophenoxy-lower alkyl, halophenylthio-lower alkyl, alkylcarboxy-lower alkyl, benzyl, halobenzyl, nitrobenzyl, lower alkyl-benzyl and lower alkoxy-benzyl, and
A is an anion of an acid selected from the group consisting of hydrohalic acids and toluene-sulfonic acids.

2. 1,9-bis-(1'-methyl-pyridinium-4'-thio)-n-nonane di-(p-toluene-sulfonate).

3. 1,10-bis-(1'-methyl-pyridinium-4'-thio)-n-decane di-(p-toluene-sulfonate).

4. 1,10-bis-(1'-methyl-pyridinium-4'-thio)-n-decane di-iodide.

5. 1,10-bis-[1' - (β-hydroxyethyl)-pyridinium-4'-thio]-n-decane dichloride.

6. 1,10-bis-(1'-allyl-pyridinium-4'-thio)-n - decane di-bromide.

7. 1,12-bis-(1'-methyl-pyridinium-4'-thio)-n - dodecane di-(p-toluene-sulfonate).

References Cited in the file of this patent

UNITED STATES PATENTS

| | | |
|---|---|---|
| 2,429,096 | Ladd | Oct. 14, 1947 |
| 2,446,796 | Van Campen | Aug. 10, 1948 |
| 2,729,644 | Klopping | Jan. 3, 1956 |
| 2,810,724 | Pierson | Oct. 22, 1957 |
| 2,812,332 | Pennino | Nov. 5, 1957 |
| 2,826,584 | Cislak | Mar. 11, 1958 |

UNITED STATES PATENT OFFICE
CERTIFICATE OF CORRECTION

Patent No. 3,121,088                 February 11, 1964

Dietrich Jerchel et al.

It is hereby certified that error appears in the above numbered patent requiring correction and that the said Letters Patent should read as corrected below.

Column 6, lines 24 to 32, for the lower left-hand portion of the formula reading:

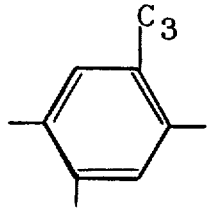     read     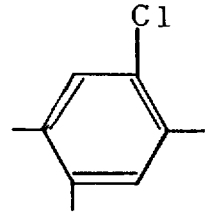

column 8, lines 40 to 47, for the lower left-hand portion of the formula reading:

     read     

same column 8, lines 60 to 66, first line of the formula reading:

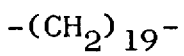     read     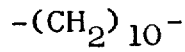

column 13, line 10, for "effect" read -- effective --.

Signed and sealed this 30th day of June 1964.

(SEAL)
Attest:

ERNEST W. SWIDER                EDWARD J. BRENNER

Attesting Officer                Commissioner of Patents